United States Patent [19]

Johnston

[11] Patent Number: 4,499,373

[45] Date of Patent: Feb. 12, 1985

[54] DIFFERENTIAL PRESSURE SENSING APPARATUS

[75] Inventor: James S. Johnston, Bognor Regis, England

[73] Assignee: Rosemount Engineering Company Limited, England

[21] Appl. No.: 383,574

[22] Filed: Jun. 1, 1982

[30] Foreign Application Priority Data

Jun. 9, 1981 [GB] United Kingdom ............... 8117700

[51] Int. Cl.$^3$ .............................................. G01D 5/34
[52] U.S. Cl. ................................. 250/231 P; 73/705
[58] Field of Search ..................... 250/231 P, 237 G; 73/705, 717; 356/372

[56] References Cited

U.S. PATENT DOCUMENTS 3,590,640 7/1971 Cindrich .............................. 73/705
4,160,600 7/1979 Luke .................................... 73/705

FOREIGN PATENT DOCUMENTS 1549227 7/1979 United Kingdom .

Primary Examiner—David C. Nelms
Assistant Examiner—J. Jon Brophy
Attorney, Agent, or Firm—Kinney & Lange

[57] ABSTRACT

A differential pressure sensor has a sensing diaphragm mounted in a body. The curvature of the diaphragm is representative of differential pressure across the diaphragm. Monochromatic light is direct from a source at the diaphragm to set up interference fringes which have varying spacings representative of the curvature, in the manner of Newton's rings. The fringes and their spacings are monitored and a computer calculates therefrom the curvature of the diaphragm and thence the pressure difference.

11 Claims, 2 Drawing Figures

DIFFERENTIAL PRESSURE SENSING APPARATUS

BACKGROUND OF THE INVENTION

The present invention is concerned with differential pressure sensing apparatus.

A well known form of differential pressure sensor comprises a body in which there is mounted a diaphragm which separates two pressure chambers within the body. The pressure difference to be measured is applied across the diaphragm usually by supplying a pressure transmitting fluid at appropriate pressures to each pressure chamber. The pressure difference across the diaphragm then distorts or strains the diaphragm and the amount of distortion or strain is measured to provide an indication of the pressure difference. Commonly, the diaphragm is planar in the absence of a pressure difference across it. In one known arrangement, the displacement of the diaphragm to one side or the other of the rest plane is monitored and used to provide an indication of the differential pressure. A commonly used technique for monitoring the displacement of the diaphragm is the capacitative technique in which the diaphragm constitutes a movable plate in a capacitor. The displacement of the diaphragm can be monitored by measuring variations in the capacitance of the capacitor. Commonly, a fixed capacitor plate is provided on each side of the diaphragm and the capacitances of both capacitors formed thereby are monitored and used to provide an indication of the differential pressure.

SUMMARY OF THE INVENTION

The present invention is concerned with an optical technique for monitoring or measuring the strain of a diaphragm in a differential pressure transducer of the above general kind.

According to the present invention, differential pressure sensing apparatus comprises a transducer body, a diaphragm mounted in the body, means for applying across the diaphragm a differential pressure to be measured, whereby the diaphragm is strained in response thereto so as to have a curvature representative of said pressure difference, monochromatic light source means arranged to direct monochromatic light at the diaphragm and to set up interference fringes in which successive spacings between adjacent fringes vary in a manner representative of said curvature of the diaphragm, means for monitoring said fringes to provide signals indicative of said manner of variation of said spacings, and automatic computing means arranged to receive said signals and to calculate therefrom said curvature of the diaphragm and thence the pressure difference across the diaphragm.

With this arrangement, the curvature itself of the diaphragm can be monitored and used to provide an indication of the pressure difference across the diaphragm. The distance of the diaphragm from a datum point, or its displacement, is not monitored directly, but only the curvature. It can be seen that the curvature is on its own a true indication of the pressure difference across the diaphragm.

In the arrangement of the present invention, the monochromatic light source means is arranged, in effect, to set up so-called Newton's rings, employing the diaphragm as one of the reflecting surfaces from which reflected light interferes with light from a second surface to produce the interference fringes.

Normally, the diaphragm is circular and of uniform thickness and modulus of elasticity, so as to have a part spherical profile when strained. By monitoring the interference fringes produced in the apparatus of the present invention, to provide signals indicative of the manner of variation of the spacings between adjacent fringes, the radius of curvature of the diaphragm can be calculated, and thence a value for the differential pressure.

Normally, the transducer body is formed to have respective part spherical surfaces on each side of the circular diaphragm defining with the diaphragm respective pressure chambers, said surfaces being shaped to support the diaphragm when strained to a profile of minimum radius corresponding to a design maximum pressure difference. In this way, the diaphragm is supported against excessive differential pressures which might otherwise destroy the diaphragm or strain it beyond its yield point.

Then, conveniently, at least a part of said transducer body is transparent to provide a window into at least one of the pressure chambers on one side of the diaphragm, said part spherical surface of the window being partially reflecting, and said monochromatic light source means is arranged to direct a beam of monochromatic light through said window into said chamber and at said diaphragm in a transverse radial plane relative to the diaphragm, said beam having a width in said plane which is sufficient that successive interference fringes can be formed across the width by interference of light reflected from the diaphragm with light reflected from said partially reflecting window surface.

If $R_1$ is the radius of curvature of said partially reflecting window surface and $R_2$ is the radius of curvature of the diaphragm, where both $R_1$ and $R_2$ curve in the same sense, then it can be shown that $$\frac{R_1 R_2}{R_1 - R_2} = \frac{\Delta_n \Delta_{n-1}(\Delta_n + \Delta_{n-1})\mu}{(\Delta_{n-1} - \Delta_n)\lambda} \quad (1)$$

where $\Delta_n$ and $\Delta_{n-1}$ are two consecutive fringe spacings, $\mu$ is the refractive index of the pressure transmitting fluid in the pressure chamber between the diaphragm and the partially reflecting window surface, and $\lambda$ is the wavelength in free space of the monochromatic light. This formula may be re-written as $$\frac{1}{R_2} = \frac{1}{R_1} - \frac{\lambda(\Delta_{n-1} - \Delta_n)}{\mu \Delta_n \Delta_{n-1}(\Delta_n + \Delta_{n-1})} \quad (2)$$

$1/R_2$ is proportional to the pressure difference across the diaphragm and the apparatus described above can supply values for $\Delta_n$ and $\Delta_{n-1}$ so that the automatic computing means is then arranged to perform the function on the right-hand side of the above formula 2, to provide a value for $1/R_2$ and hence for the differential pressure.

In the more general case where the profile of the diaphragm and the profile of the partially reflecting surface are not circular, corresponding formulae can readily be derived relating the curvature of the diaphragm to variations in successive spacings between adjacent fringes. The apparatus of the present invention enables such variations to be monitored and thus a value for the curvature of the diaphragm to be calculated.

The differential pressure across the diaphragm can thereby be calculated also.

It will be appreciated that substantially all of one side of the transducer body may be made transparent so that said window extends substantially over the entire diaphragm. However, it is only necessary for a radial slice of the transducer body on one side of the diaphragm to be made transparent so that said window extends only as a slice in said radial transverse plane.

Conveniently, said means for monitoring is arranged to produce signals providing measures of at least two successive spacings in said plane of adjacent fringes or adjacent groups of fringes, and said automatic computing means is arranged to calculate from said spacing measures the radius of curvature of the diaphragm and thence the differential pressure.

It can be seen from formula 2 above, that $(1/R_2)$ is dependent on $\lambda$ and $\mu$. The refractive index $\mu$ of the pressure transmitting fluid in the pressure chamber (typically oil) is a function of the density of the fluid which varies with temperature. The apparatus may include a refractometer arranged to provide a signal indicative of the refractive index of the pressure transmitting fluid and the automatic computing means may then be arranged to receive also said refractive index signal and to compute therefrom a corrected value for the radius of curvature of the diaphragm which can be independent of temperature variations.

However, in a preferred arrangement in which each said pressure chamber is filled with pressure transmitting fluid which has a refractive index dependent on the density of the fluid, a respective said window in the transducer body is provided into the pressure chambers on each side of the diaphragm and said light source means is arranged to set up a respective set of interference fringes representative of the curvature of each face of the diaphragm, said means for monitoring being arranged to monitor each said set of fringes and provide respective corresponding output signals and said automatic computing apparatus being arranged to calculate from said respective output signals corresponding to the two sets of fringes, a value for the radius of curvature of the diaphragm which is independent of variations in the refractive index of the pressure transmitting fluid, and thence a value of the pressure difference which is independent of temperature and line pressure. In the above arrangement, the computing means can, by using formula 1, derive the values $$\frac{R_{1A} - R_{2A}}{R_{1A} R_{2A}} \text{ and } \frac{R_{1B} - R_{2B}}{R_{1B} R_{2B}},$$

where A & B refer to the two sides of the diaphragm. These two values can be used to form the value $$F = \frac{\left(\frac{R_{1A} - R_{2A}}{R_{1A}R_{2A}}\right) - \left(\frac{R_{1B} - R_{2B}}{R_{1B}R_{2B}}\right)}{\left(\frac{R_{1A} - R_{2A}}{R_{1A}R_{2A}}\right) + \left(\frac{R_{1B} - R_{2B}}{R_{1B}R_{2B}}\right)} \quad (3)$$

It can be seen that F in the above expression 3 is independent of $\mu$ and $\lambda$. Further, $R_{2B} = -R_{2A}$, so that equation 3 can be rewritten $$\frac{1}{R_{2A}} = \frac{(R_{1B} - R_{1A}) - F(R_{1B} + R_{1A})}{2R_{1A} R_{1B}} \quad (4)$$

Since $1/R_{2A}$ is proportional to the differential pressure across the diaphragm, equation 4 provides a measure of the differential pressure which is independent of $\mu$ and $\lambda$.

In a typical case, $R_{1A} = R_{1B}$ so that equation 4 reduces to $$\frac{1}{R_{2A}} = \frac{-F}{R_{1A}} \quad (5)$$

In this way the differential pressure measuring apparatus can be used to provide an indication of the differential pressure which is independent of variations in the density of the pressure transmitting fluid and thus independent of both the temperature and line pressure of the fluid.

In one embodiment said monitoring means comprises a linear array of electronic photodetectors, means for focusing an image of the interference fringes on to the array so that spacings between fringes extend along the array and means for electronically scanning along the photodetectors of the array to produce a series of output signals indicative of the intensity of light incident on successive said detectors. Said monitoring means may include a threshold detector responsive to said series of output signals to provide a corresponding serial digital signal having at least two possible states corresponding to the output signals being above or below a predetermined threshold.

Said monochromatic light source means may include a plurality of optical fibres flexibly interconnecting the transducer body with a source of light and said fringe monitoring means, and arranged to transmit the fringe geometry to said fringe monitoring means.

The present invention also provides differential pressures sensing apparatus comprising a transducer body, a diaphragm mounted in the body, means for applying across the diaphragm a differential pressure to be measured whereby the diaphragm is strained in response thereto so as to have a circular profile in at least one plane perpendicular to the diaphragm with the radius of curvature of the profile dependent on said pressure difference, the diaphragm having a light reflective surface at least at said plane, means forming a partially reflective surface extending transversely of said plane at least at said plane and having a profile in said plane which is linear or circular with a predetermined radius, means for directing a parallel beam of monochromatic light in said plane at the diaphragm through the partially reflective surface, said beam having a width in said plane which is sufficient that successive interference fringes can be formed across the width by interference of light reflected from the diaphragm with light reflected from said partially reflective surface, means for measuring at least two successive spacings in said plane of adjacent fringes or adjacent groups of fringes, and automatic computing means arranged for calculating from said measured spacings the radius of said circular profile of the diaphragm and thence the pressure difference across the diaphragm.

BRIEF DESCRIPTION OF THE DRAWING

Examples of the present invention will now be described with reference to the accompanying drawing wherein.

DETAILED DESCRIPTION OF PREFERRED EXAMPLES

Figure 1:
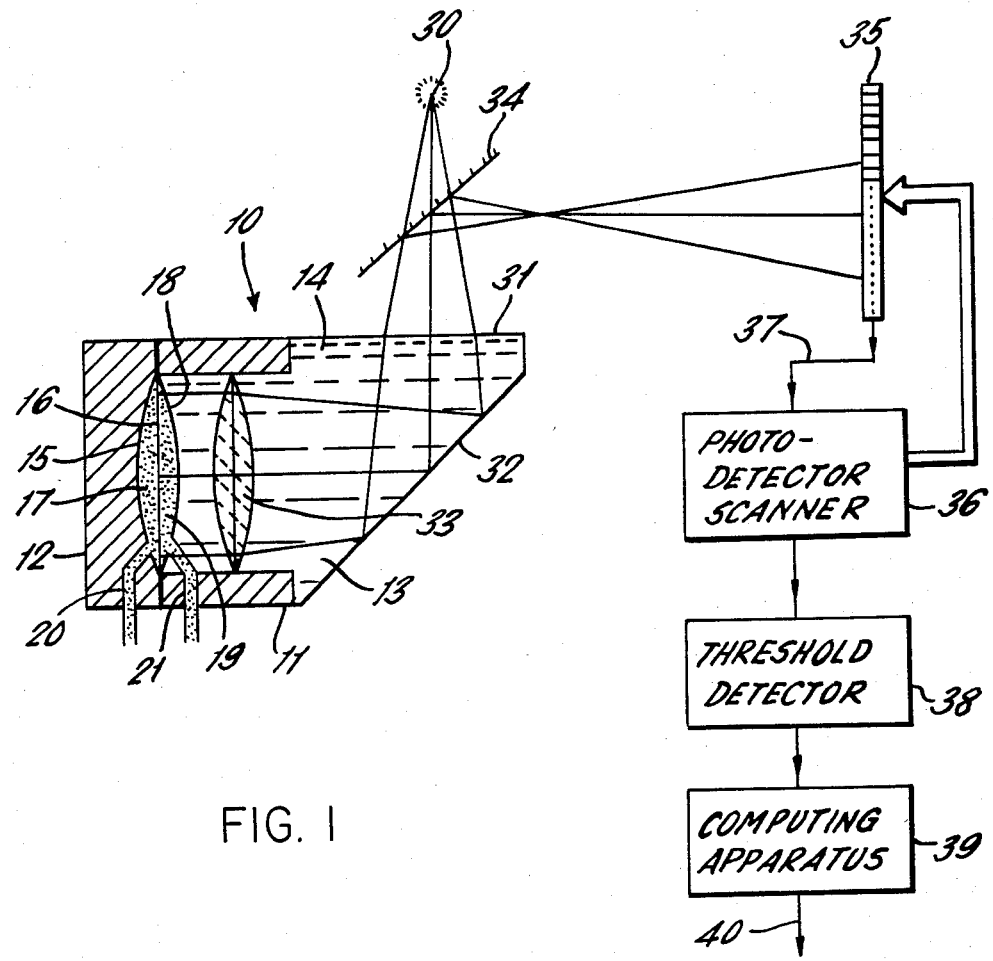
FIG. 1 is a cross sectional view of a pressure sensing transducer together with a schematic block diagram of associated electronic apparatus, together embodying the present invention.

In the drawing, a differential pressure transducer 10 comprises a body 11 of generally cylindrical form and shown in axial section in the drawing. The body 11 comprises a first part 12 which may be opaque and is formed as a cylinder open at one end 13, and a second part 14 of a transparent material such as glass or clear plastics. The end of the cylinder 12 opposite to the open end 13 is closed and formed internally with a concave part-spherical end face 15 having a predetermined radius of curvature. A circular diaphragm is mounted in the cylinder 12 adjacent the end face 15 in a plane perpendicular to the axis of the transducer. The diaphragm 16 is typically formed of metal and is secured above its periphery to the walls of the cylinder 12 to define a first pressure chamber 17 between the diaphragm and the end face 15.

The transparent part 14 of the transducer extends into the cylinder 12 forming a fluid-tight seal with the internal cylindrical surface of the cylinder and is formed with an end face 18 adjacent the diaphragm 16 also having a concave spherical shape. Thus, the end face 18 of the transparent part 14 of the transducer forms with the diaphragm 16 a second pressure chamber 19 on the opposite side of the diaphragm to the pressure chamber 17.

Fluid passages 20 and 21 are provided through the material of the cylinder 12 and transparent part 13 to provide fluid communication with each of the pressure chambers 17 and 19 respectively. In use, the chambers 17 and 19 and passages 20 and 21 are filled with a pressure-transmitting fluid, typically a substantially incompressible liquid such as oil. Then, the pressures of which the difference is to be measured by the transducer 10 are transmitted to the respective chambers 17 and 19 by the fluid. Thus, in use the passages 20 and 21 are connected via pressure-resistant tubes to the usual isolator assembly which isolates the pressure-transmitting fluid, typically oil, from the medium of which the pressure is being measured.

It will be appreciated that, as usual for such diaphragm type pressure transducers, the differential pressure across the membrane 16 strains the membrane causing it to deflect away from its neutral plane and adopt a part-spherical configuration. The radii of curvature of the two faces 15 and 18 of the transducer body bounding the chambers 17 and 19 are chosen to correspond with the maximum permissible curvature of the diaphragm 16 before the strain of the diaphragm exceeds its yield point. In this way, the faces 15 and 18 act as supporting surfaces to resist further deviation of the diaphragm 16 even if the differential pressure across the diaphragm exceeds the design maximum.

In the arrangement shown in the drawing, a cone of monochromatic light from a point source 30 enters the transparent part 14 of the transducer 10 via a side face 31 which may be made substantially planar. The cone of light is deflected through a mean of 90° by total internal reflection in the transparent part 14 at an oblique end face 32 of the part. The light reflected from the face 32 is directed axially along the transparent part of the transducer towards the diaphragm 16. A lens 33 is provided set in the transparent part 14 and arranged to collimate the cone of rays from the point source 30, so that the rays of light passing through the part-spherical face 18 into the pressure chamber 19 are parallel.

Light entering the chamber 19 is reflected from the diaphragm 16 back along its path. Furthermore, the part-spherical surface 18 is made partially reflecting so that only a proportion of the light enters the chamber 19 the remainder also being reflected back along its path. It will be appreciated that the light reflected from the diaphragm 16 interferes with light refected from the surface 18 so as to form interference fringes. With the reflecting surface of the diaphragm 16 and the partially refecting surface 18 being both symmetrical about the axis of the transducer 10, the interference fringes are in the form of rings and are known as Newton's rings.

The interfering light reflected from the diaphragm 16 and surface 18 returns along the same path towards the light source 30. A partially reflecting mirror 34 is located in the path between the light source 30 and the side surface 31 of the transparent part 14 of the transducer 10 and serves to deflect a part of the reflected interfering light to focus the interference fringes onto an array 35 of photo-electric detectors.

The array 35 comprises a linear array of detectors and is located so as to extend along a diameter of the interference rings. The spacing of adjacent detectors in the array is arranged to be less than the closest spacing of adjacent interference rings imaged onto the detector array. If the spacing of the detectors in the array 35 is known, their outputs can be used to provide indications of the relative spacings between fringes. In practice, a photo detector scanner 36 is arranged to scan through the array of detectors one by one so that a serial output signal from the array 35 is produced on a line 37. The serial signal representing the outputs of the photo detectors of the array 35 in succession is supplied from the scanner 36 to a threshold detector 38. The output of the detector 38 is a bi-state signal having a high, or logic 1, state indicative of the scanner output being above a predetermined threshold, and a low output, or logic 0, indicative of the scanner output being below the threshold. Thus, the output of the threshold detector 38 is a serial binary logic signal comprising a series of logic 1's and logic 0's indicative of the distribution of fringes across the array 35. The binary logic signal from the detector 38 is in turn supplied to computing apparatus 39 which operates on the serial signal to provide a measure of successive fringe spacings and thence, as will be described in more detail, a measure of the differential pressure across the diaphragm 16 of the transducer 10.

As has been explained previously, the variation of the spacings of adjacent fringes or adjacent groups of fringes is dependent on the radius of curvature of the diaphragm 16, which is in turn dependent on the differential pressure across the diaphragm. For the circularly symmetric arrangement illustrated in the drawing, with part-spherical surfaces and a circular diaphragm 16 which is strained into a part-spherical shape, the radius of curvature of the diaphragm 16 is related to a pair of successive spacings between adjacent fringes by equation (2) referred to above. Thus, the computing apparatus 39 may be arranged to calculate a value for $(1/R_2)$, by determining from the serial binary signal from the detector 38 values for $\Delta_{n-1}$ and $\Delta_n$. Values for $R_1$ and $\lambda$ and $\mu$ can be predetermined and stored in computer memory. In this way, the computing apparatus can provide a value on an output line 40 indicative of the differential pressure which is directly related to $1/R_2$.

However, it will be appreciated from the above that an accurate value for $(1/R_2)$ can be obtained only if $\lambda$ and $\mu$ are accurately known and constant. In practice, $\mu$ is dependent on the temperature of the pressure-transmitting fluid filling the pressure chambers 17 and 19. Thus, without compensation, the value provided by the computing apparatus from the above equation (2) would be temperaturedependent. Compensation may be provided by including a refractometer in the transducer 10 which automatically provides a signal representing the refractive index of the fluid in the chambers 17 and 19 for use by the computing apparatus 39 in correcting the value of $(1/R_2)$.

Figure 2:
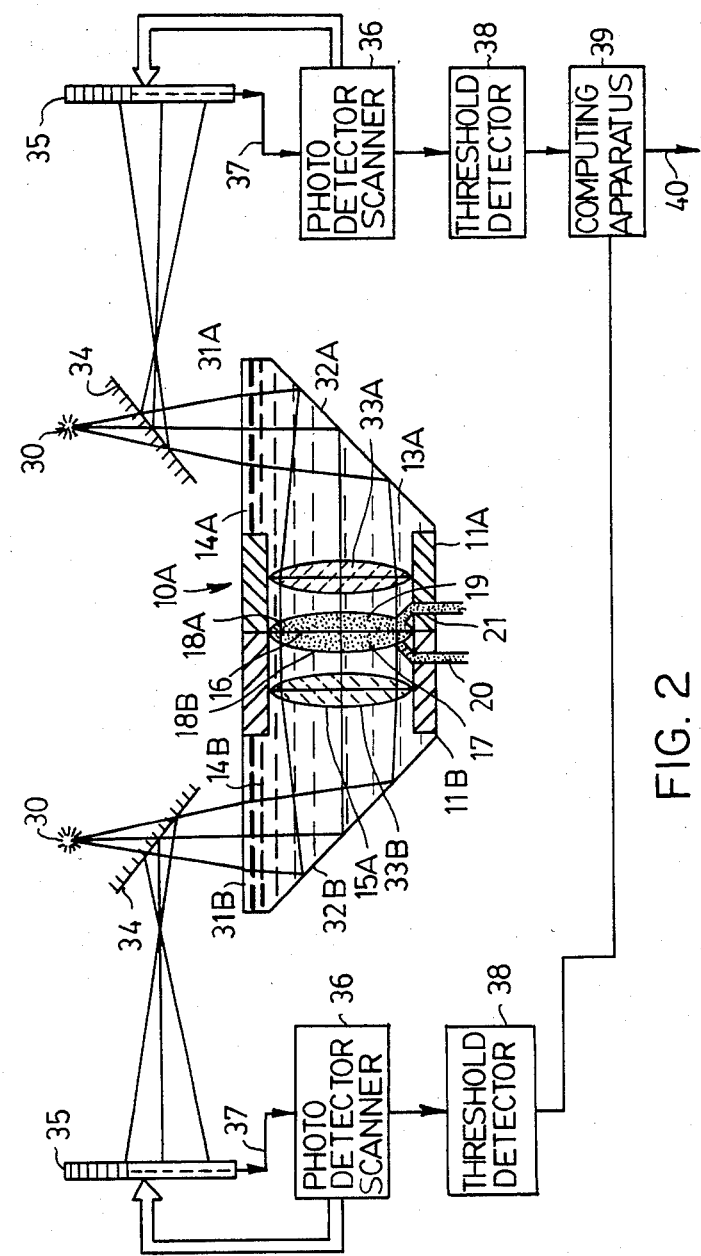
FIG. 2 is a form of transducer having parts on both sides of the diaphragm and operating according to the present invention.

Alternatively, a modified form of transducer shown at 10A in FIG. 2, where identical parts are identically numbered, except that the suffix "A" is used for the numbers on the right hand side of the diaphragm 16, except for the parts defining the chambers 17 and 19, and the suffix B is used on the numbers on the left hand side of the transducer. Such transducer 10A may be provided having transparent parts 14A and 14B corresponding to part 14 on both sides of the diaphragm 16 together with means 30, 33 and 34 for directing collimated light through both transparent parts 14A and 14B into the pressure chambers 17 and 19 defined by end faces 18A and 18B and at both faces of the diaphragm 16. A further photodetector array 35 corresponding to the first mentioned array 35 is also then provided with an associated scanner 36 and threshold detector 38 so as to produce a respective serial binary signal representing the fringe spacings on each side of the diaphragm. The identical parts are numbered identically in FIG. 2. If both these binary signals are supplied to the computing apparatus 39, then, as explained previously, a function F may be calculated in the computing apparatus 39 using equations (1) and (3). From function F, the computing apparatus may be used to calculate a value for $1/R_2$ from equation (5) which is independent of $\mu$ and $\lambda$ and thus independent of temperature, and also of the line pressure of the fluid in chambers 17 and 19.

It is a relatively straightforward matter to programme the computing apparatus 39 to perform the operations and functions described above to provide the desired output signal on line 40 representing the differential pressure.

For example, the computing apparatus 39 may comprise a shift register into which the binary output of the threshold detector 38 for one complete scan of the photo-detectors 35 is loaded. If the photo-detectors 35 are scanned sufficiently quickly, it can be seen that a near instantaneous "frozen" recording can be entered into the shift register of the fringe pattern on the photo-detectors 35 at a selected moment. Thus an instantaneous fringe pattern can be recorded in the shift register irrespective of whether the fringes are in fact moving as a result of pressure variations.

The contents of the shift register can then be reviewed and analysed by a suitably programmed micro-computer arranged to determine therefrom the spacing of adjacent dark fringes and calculate from these spacings one or more values for $1/R_2$ from formula (2) above. Since $1/R_2$ is proportional to the pressure difference across the diaphragm, the calculated value can be appropriately scaled to provide a value for the pressure difference and the micro-computer can be arranged to display the calculated pressure difference, e.g. on a printer. Any of the various known and available types of micro-computer can be employed suitably connected and programmed for this computing operation, such as micro-computers available from Zilog, Intel or Motorola. Furthermore, it is a straightforward matter for a person familiar with the art to produce a suitable programme for the micro-computer to perform the above functions. For example a suitable programme may be written in the computer language known as BASIC.

There follows an outline of the main structure of an example of an appropriate programme. It should be noted that the following listing is not a complete instruction listing for a programme but clearly indicates the essential steps of an example of a programme which identifies spacings between successive dark fringes and solves equation (2). It would be clear to one familiar with the art that equivalent programmes could be written in other languages or in machine code. Furthermore similar programmes could be written to deal with multiple fringe spacings and to solve the other equations given herein such as equations (4) or (5).

In a typical example, the array of photo-detectors 35 may comprise 1024 photo-detector elements, so that the shift register in the computing apparatus must also have a length of 1024 bits. The shift register should be loaded with one complete scan within say 1 mS.

There follows an outline programme listing of a typical programme which solves equation (2) for the first two fringe spacings.

| Program Arrangement | Remarks |
|---|---|
| Line No | |
| 10 C = 0 | Sets counter to zero |
| 20 R1 = 1 | Sets $R_1$ equal to (e.g.) 1 m |
| 30 X = 0 | |
| 40 L = 0.5 × 10$^{-6}$ | Sets $\lambda$ equal to (e.g.) 0.5 $\mu$m |
| 50 M = 1.4 | Sets $\mu$ equal to (e.g.) 1.4 |
| 60 A = 10$^{-5}$ | Sets scale factor since photo-detector spacing is equivalent to (say) 10 $\mu$m |
| 70 K = L/M*A ↑ 2 | Defines multiplier for second term in eq$^u$ 2 |
| 80 Step shift register one step | |
| 90 S1 = output of shift register | Puts 1 or 0 from shift register into S1 |
| 100 C = C + 1 | Increments counter |
| 110 IF C = 1024 GO TO 250 | |
| 120 IF C ≠ 1 GO TO 150 | ⎫ Deals with first two pulses |
| 130 S2 = S1 | ⎬ from shift register |
| 140 GO TO 80 | ⎭ |
| 150 IF S1 > S2 GO TO 180 | ⎫ Identifies light-to-dark and |
| 160 IF S1 < S2 GO TO 210 | ⎬ dark-to-light transitions |
| 170 GO TO 130 | ⎭ |
| 180 X = X + 1 | ⎫ Numbers and stores the |
| 190 BX = C | ⎬ counter readings for |
| 200 GO TO 130 | ⎪ beginning (B) and end (E) |
| 210 IF X = 0 GO TO 130 | ⎪ of each dark band |
| 220 Y = X | ⎪ |
| 230 EY = C | ⎪ |
| 240 GO TO 130 | ⎭ |
| 250 FOR Z = 1 TO Y | ⎫ Numbers and stores the |
| 260 FZ = (BZ + EZ)/2 | ⎬ positions of the centre of |
| 270 NEXT Z | ⎭ each dark band |

-continued

| Program Arrangement | Remarks |
|---|---|
| 280 FOR N = 2 TO Y<br>290 M = N − 1<br>300 DM = FN − FM<br>310 NEXT N | Numbers and stores the values of $\Delta_n$ |
| 320 PRINT"1/R2 = " 1/R1 − $\dfrac{K * (D2 - D1)}{D2 * D1 * (D2 + D1)}$ | Prints the value of $1/R_2$ computed from the first two fringe spacings |

Instead of using measured values for $\Delta_n$ and $\Delta_{n-1}$ for calculating the radius of curvature of the diaphragm, the computing apparatus may be arranged to determine from the serial binary signal or signals the spacing between successive groups of fringes. Using such spacing values can improve the accuracy of the apparatus. For example, the spacing between successive groups of ten fringes may be employed.

Still further, if sufficient computing power is available in the computing apparatus, equation (1) mentioned above may be fitted to each adjacent pair of fringes detected by the array 35 and represented in the serial digital signal from the detector 38.

In the drawing, the transparent part 14 extends completely about the axis of the transducer 10 and can produce complete interference rings. However, it will be appreciated that the array 35 is responsive only to a single radius or diameter of such rings. Accordingly, the transducer 10 may be formed with only a radially extending slice or segment of transparent material. The transparent slice or segment is provided in a plane perpendicular to the diaphragm 16 and collimated light from the point source 30 is directed through the slice or segment into the chamber 19 for reflection by the diaphragm 16. Such slice or segment is also represented in the drawing in that the sectional plane of the drawing is the transverse radial plane of the slice or segment.

Again, although the light from the source 30 and reflecting interfering light are shown in the drawing reflected in the transparent part 14 of the transducer 10 by the surface 32, in a different arrangement the source 30 may be provided substantially on the axis of the transducer 10 and light from the source 30 can then pass directly along the axis to the diaphragm 16 without reflection.

In yet another arrangement, optical fibres may be employed to transmit the geometry of the interference fringes from the transducer 10 to a remotely located array 35. Such an arrangement would then obviate the need to have electronic components, such as the array 35, located adjacent the transducer 10.

What is claimed is:

1. Differential pressure sensing apparatus comprising a transducer body, a diaphragm mounted in the body, means for applying across the diaphragm a differential pressure to be measured, whereby the diaphragm is strained in response thereto so as to have a curvature representative of said pressure difference,
    monochromatic light source means arranged to direct monochromatic light at the diaphragm and to set up interference fringes in which successive spacings between adjacent fringes vary in a manner representative of said curvature of the diaphragm,
    means for monitoring said fringes to provide signals indicative of variations in the spacing between adjacent fringes or adjacent groups of fringes, and automatic computing means arranged to receive said signals and to calculate therefrom said curvature of the diaphragm and thence the pressure difference across the diaphragm.

2. Differential pressure sensing apparatus comprising a transducer body, a diaphragm mounted in the body, means for applying across the diaphragm a differential pressure whereby the diaphragm is strained in response thereto so as to have a part circular profile in at least one plane perpendicular to the diaphragm with the radius of curvature of the profile dependent on said pressure difference, the diaphragm having a light reflective surface at least adjacent said plane, means forming a partially reflective surface extending transversely of said plane at least in the region of said plane and having a profile in said plane which is linear or circular with a predetermined radius,
    means for directing a parallel beam of monochromatic light in said plane at the diaphragm through the partially reflective surface, said beam having a width in said plane which is sufficient that successive interference fringes can be formed across the width by interference of light reflected from the diaphragm with light reflected from said partially reflective surface,
    means for measuring at least two successive spacings in said plane of adjacent fringes or adjacent groups of fringes,
    and automatic computing means arranged for calculating from said measured spacings the radius of said circular profile of the diaphragm and thence the pressure difference across the diaphragm.

3. Differential pressure sensing apparatus as claimed in claim 1 wherein the diaphragm is circular and of uniform thickness and modulus of elasticity, so as to have a part spherical profile when strained.

4. Differential pressure sensing apparatus as claimed in claim 3, wherein the transducer body is formed to have respective part spherical surfaces on each side of the diaphragm defining with the diaphragm respective pressure chambers, said surfaces being shaped to support the diaphragm when strained to a profile of minimum radius corresponding to a design maximum pressure difference.

5. Differential pressure sensing apparatus as claimed in claim 4, wherein at least a part of said transducer body is transparent to provide a light path into at least one of the pressure chambers on one side of the diaphragm, said part spherical surface being partially reflecting, and said monochromatic light source means is arranged to direct a beam of monochromatic light along said light path into said chamber and at said diaphragm in a transverse radial path relative to the diaphragm, said beam having a width in said plane which is sufficient that successive interference fringes can be formed across the width by interference of light reflected from the diaphragm with light reflected from said partially reflecting window surface.

6. Differential pressure sensing apparatus as claimed in claim 5, wherein said light path comprises a radially extending slice of said body in said transverse radial plane.

7. Differential pressure sensing apparatus as claimed in either of claims 5 and 6, wherein said means for monitoring is arranged to produce signals providing measures of at least two successive spacings in said plane of adjacent fringes or adjacent groups of fringes, and said automatic computing means is arranged to calculate from said spacing measures the radius of curvature of the diaphragm and thence the differential pressure.

8. Differential pressure sensing apparatus as claimed in claim 5, wherein each said pressure chamber is fitted with a pressure transmitting fluid which has a refractive index dependent on the density of the fluid and wherein a respective said light path in the transducer body is provided into the pressure chambers on each side of the diaphragm and said light source means is arranged to set up a respective set of interference fringes representative of the curvature of each face of the diaphragm, said means for monitoring being arranged to monitor each said set of fringes and provide respective corresponding output signals and said automatic computing apparatus being arranged to calculate from said respective output signals corresponding to the two sets of fringes, a value for the radius of curvature of the diaphragm which is independent of variations in the refractive index of the pressure transmitting fluid, and thence a value for the pressure difference which is independent of temperature and line pressure.

9. Differential pressure sensing apparatus as claimed in claim 1 or in claim 3, wherein said monitoring means comprises a linear array of electronic photodetectors, means for focusing an image of the interference fringes on to the array so that spacings between fringes extend along the array and means for electronically scanning along the photodetectors of the array to produce a series of output signals indicative of the intensity of light incident on successive said detectors.

10. Differential pressure sensing apparatus as claimed in claim 9, wherein said monitoring means includes a threshold detector responsive to said series of output signals to provide a corresponding serial digital signal having at least two possible states corresponding to the output signals being above or below a predetermined threshold.

11. Differential pressure sensing apparatus as claimed in claim 1 or in claim 3, wherein said monochromatic light source means includes a plurality of optical fibres flexibly interconnecting the transducer body with a source of light and said fringe monitoring means, and arranged to transmit the fringe geometry to said fringe monitoring means.

* * * * *